(No Model.)
W. W. WELLS & H. E. TIDMARSH.
FRICTION CLUTCH.
No. 493,608. Patented Mar. 14, 1893.
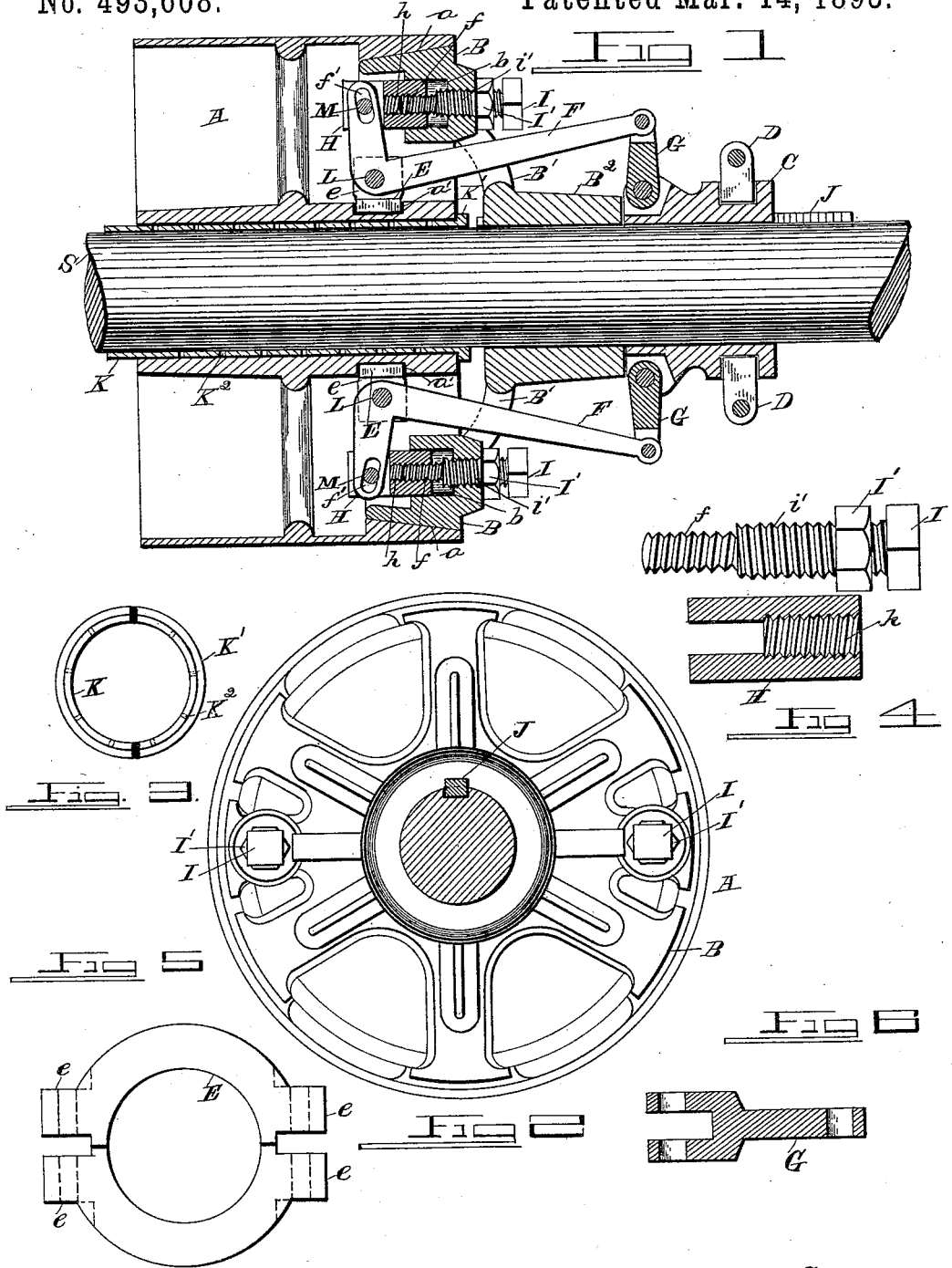
Witnesses
C. W. Seville
James R. Mansfield
Inventors:
Wm. Wesley Wells
Harry E. Tidmarsh
By Attorneys
Alexander & Dowell

UNITED STATES PATENT OFFICE.

WILLIAM WESLEY WELLS AND HARRY ELMER TIDMARSH, OF SANDY HILL, NEW YORK.

FRICTION-CLUTCH.

SPECIFICATION forming part of Letters Patent No. 493,608, dated March 14, 1893.

Application filed November 16, 1892. Serial No. 452,200. (No model.)

*To all whom it may concern:*

Be it known that we, WILLIAM WESLEY WELLS and HARRY ELMER TIDMARSH, of Sandy Hill, in the county of Washington and State of New York, have invented certain new and useful Improvements in Friction-Clutches; and we do hereby declare that the following is a full, clear, and exact description thereof, reference being had to the accompanying drawings, and to the letters of reference marked thereon, which form part of this specification.

This invention is an improved friction clutch, and its objects are to provide means for accurately adjusting the contact between the opposed members of the clutch, and for compensating for wear thereof, to reduce the number of loose connections between the male and female members of the clutch, and to place the adjusting and main operating parts between the clutch members so that they will be protected thereby.

The invention therefore consists in the novel construction and combination of parts hereinafter claimed and described as follows, reference being had to the accompanying drawings illustrating the invention by letters of reference marked thereon.

Figure 1 is a longitudinal central section through the clutch as applied to a pulley. Fig. 2 is a face view thereof with collar and links removed. Fig. 3 is a detail view of the split bushing. Fig. 4 is a detail side view of an adjusting bolt, and sectional view of the tube or block. Fig. 5 is a detail enlarged view of the fulcrum ring. Fig. 6 is a detail.

A represents a pulley having a conical frictional surface $a$ at one side and loosely mounted on a shaft S.

K is a split bushing for pulley A mounted on the shaft and free to revolve thereon, while pulley A is free to revolve on this bushing. This bushing is split longitudinally and preferably made longer than the hub of pulley to allow it a slight longitudinal movement in the hub, and has a flange K' on its end adjoining the opposite member of the pulley. It is also provided with numerous perforations $K^2$ in which oil or other lubricant can collect and be distributed freely to the shaft and hub of pulley, making the latter easy running, and preserving its "truth" by indefinitely retarding wear and also facilitates the longitudinal shifting of the part A on the shaft.

B is the outer friction member, being a conical faced annulus adapted to fit in the frictional surface $a$ of the pulley and supported by arms or webs B' on a hub $B^2$ which is fixed on the shaft by a spline J so that it must revolve therewith. The arms B' are curved so as to allow the friction members to contact but not the hubs thereof.

A longitudinally movable collar C is splined on the shaft on the side of the hub $B^2$, and revolves with the shaft. It can be shifted by a ring D operated by a lever (not shown) or other suitable means. This collar is connected by pivoted links G, G, with the outer ends of the longer arms of bell crank levers F, F, which are pivoted at their bends on bolts L, L, attached to ears $e$, $e$, on a split ring bearing E loosely confined in an annular groove $a'$ in the hub of pulley A as shown. Bolts L serve both to unite the halves of the split ring and as fulcrums for the levers F, F. The shorter arms of levers F, F, extend radially toward the rim of pulley and stand to the inside of annulus B. Their extremities are pivotally connected by bolts M to adjustable tubes, cylinders or blocks H, H, preferably of wrought metal and cylindrical in shape, being bifurcated or slotted to accommodate the ends of the levers which are slotted as at $f'$ to permit their necessary play on the bolts. These tubes H have internal screw threaded bores $h$ at their outer ends, and fit into sockets $b$ formed either in arms B' or in webs connected therewith. As shown there are but two levers F, but the number may be increased if desired. The tubes are secured in the sockets by bolts I which have portions of unequal diameters, the smaller portion $f$ is formed with a left-hand screw thread, and engages the bore of tube H, while the longer portion $i'$ is provided with a right-hand screw thread, and is screwed through a threaded opening in the closed outer end of the socket as shown.

Locking nuts I' may be screwed onto the portion $i'$ exterior to the socket. By turning bolts I to the right or left, the tube H can be separately moved inward or outward thereby adjusting the friction surfaces toward or from each other, without taking apart the clutch, and wear at either or both sides of the clutch taken up. After the adjustment is effected, by screwing down jam nuts I' the threads of the socket opening are relieved of much strain.

The operation will be apparent from the drawings, and is briefly as follows:—By moving collar C toward hub B², links G are brought into or slightly past a perpendicular, and the long arms of levers F are thereby forced away from the shaft, and the short arms rocked away from annulus B; through tubes H annulus B is forced toward the pulley, and through ring E the pulley is forced toward the annulus; this brings their opposed clutch faces into contact, and they are powerfully clamped together so that they must revolve together, and therefore motion can be imparted from the shaft to the pulley, or vice versa. By moving block C outward, the friction surfaces are separated, and the shaft and pulley will revolve independently.

The device may be obviously employed as a shaft coupling by fixing the pulley on one shaft, and the annulus on the other. When disconnected the ring E revolves or stands idly with the annulus.

Having thus described our invention, what we claim as new, and desire to secure by Letters Patent thereon, is—

1. The combination of the clutch member having an annularly grooved hub, a loose ring in said groove; and the opposite member provided with sockets; with tubes or blocks adjustably secured in said sockets, and angular levers each pivoted at its bend on said ring and connected by one arm to one of said tubes, and mechanism for rocking the longer arms of said levers, substantially as specified.

2. The combination of the opposed friction members, a shifting collar, and a ring loosely connected to the hub of one member, with the levers each fulcrumed on said ring, and having one arm extending through openings in the opposite member and linked to the collar, and the tubes or blocks adjustably mounted in sockets in the latter member and loosely connected to the extremities of the other arms of said levers, substantially as set forth.

3. The combination of the opposite members of the clutch and the operating levers substantially as described, with the tubes H, adjustably secured in sockets in one member of the clutch and adjusting bolts I, substantially as described.

4. The combination of the clutch members A, B, a loose ring on one member the levers F fulcrumed on said loose ring, the blocks H, and double threaded bolts I, tapped through sockets in member B and engaging blocks H, substantially as described.

5. The combination of the clutch member having sockets b, the tubes H therein, and the bolts confining and adjusting said tubes in the sockets; with the opposite clutch member and the angular levers having a loose connection to the latter member and to said tubes, whereby when the levers are rocked the clutch members are engaged or disengaged, substantially as specified.

6. The herein described clutch consisting of the member a ring loosely confined on its hub, the opposite member having sockets near its rim, the adjustable tubes confined in said sockets, the angular levers pivoted at their bends to said ring, connected by their short arms to said tubes, and the longitudinally movable collar, and links pivotally connected thereto and to the longer arms of said levers, substantially as described.

7. The combination of the shaft, the clutch member fixed thereon, the loose split bushing on the shaft adjoining said fixed member, the movable member of the clutch loose on said bushing, a ring on one of said members, with the levers each fulcrumed on said ring and connected by one arm to the opposite clutch member, and mechanism for rocking the longer arms of said levers, substantially as described.

In testimony that we claim the foregoing as our own we affix our signatures in presence of two witnesses.

WILLIAM WESLEY WELLS.
HARRY ELMER TIDMARSH.

Witnesses:
WM. J. TOWNSEND,
E. C. RILEY.